United States Patent
Polo et al.

(10) Patent No.: US 6,785,668 B1
(45) Date of Patent: Aug. 31, 2004

(54) SYSTEM AND METHOD FOR DATA FLOW ANALYSIS OF COMPLEX DATA FILTERS

(75) Inventors: Paul A. Polo, Durham, NC (US); Steven E. Giles, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 526 days.

(21) Appl. No.: 09/724,211

(22) Filed: Nov. 28, 2000

(51) Int. Cl.$^7$ .................................................. G06F 17/30
(52) U.S. Cl. .............................................. 707/2; 707/3
(58) Field of Search ................................. 707/1, 2, 3, 4

(56) References Cited

U.S. PATENT DOCUMENTS

| | | | |
|---|---|---|---|
| 4,769,772 A | 9/1988 | Dwyer | 707/2 |
| 5,091,852 A | 2/1992 | Tsuchida et al. | 707/2 |
| 5,367,675 A | 11/1994 | Cheng et al. | 707/2 |
| 5,418,950 A | 5/1995 | Li et al. | 707/4 |
| 5,421,008 A | 5/1995 | Banning et al. | 707/4 |
| 5,495,605 A | 2/1996 | Cadot | 707/4 |
| 5,548,755 A | 8/1996 | Leung et al. | 707/2 |
| 5,615,361 A | 3/1997 | Leung et al. | 707/2 |
| 5,659,728 A | 8/1997 | Bhargava et al. | 707/2 |
| 5,668,966 A | 9/1997 | Ono et al. | 345/853 |
| 5,668,987 A * | 9/1997 | Schneider | 707/3 |
| 5,696,960 A | 12/1997 | Bhargava et al. | 707/2 |
| 5,713,020 A | 1/1998 | Reiter et al. | 707/102 |
| 5,721,900 A | 2/1998 | Banning et al. | 707/4 |
| 5,724,570 A | 3/1998 | Zeller et al. | 707/3 |
| 5,761,657 A | 6/1998 | Hoang | 707/4 |
| 5,819,255 A | 10/1998 | Celis et al. | 707/2 |
| 5,822,747 A | 10/1998 | Graefe et al. | 707/2 |
| 5,822,750 A | 10/1998 | Jou et al. | 707/2 |
| 5,855,012 A | 12/1998 | Bhargava et al. | 707/2 |
| 5,864,840 A | 1/1999 | Leung et al. | 707/2 |
| 5,913,205 A | 6/1999 | Jain et al. | 707/2 |
| 5,937,401 A | 8/1999 | Hillegas | 707/2 |
| 5,960,427 A | 9/1999 | Goel et al. | 707/4 |
| 5,966,126 A | 10/1999 | Szabo | 345/762 |
| 6,021,405 A | 2/2000 | Celis et al. | 707/2 |
| 6,032,143 A | 2/2000 | Leung et al. | 707/2 |
| 6,111,574 A | 8/2000 | Meek | 345/835 |
| 6,208,985 B1 | 3/2001 | Krehel | 707/3 |
| 6,229,538 B1 | 5/2001 | McIntyre et al. | 345/734 |
| 6,253,195 B1 | 6/2001 | Hudis et al. | 707/2 |
| 6,275,801 B1 | 8/2001 | Novak et al. | 704/255 |
| 6,275,818 B1 | 8/2001 | Subramanian et al. | 707/2 |
| 6,295,517 B1 | 9/2001 | Roy et al. | 703/15 |
| 6,326,962 B1 * | 12/2001 | Szabo | 345/762 |
| 6,362,836 B1 | 3/2002 | Shaw et al. | 345/744 |
| 6,434,545 B1 * | 8/2002 | MacLeod et al. | 707/3 |

FOREIGN PATENT DOCUMENTS

WO     WO 02/061613 A2 * 8/2002

* cited by examiner

*Primary Examiner*—Jack Choules
(74) *Attorney, Agent, or Firm*—Jones Day

(57) ABSTRACT

A system and method for analyzing the data flow of a database query. The database query contains a plurality of query conditions that are used to filter data records of a database. At least one query condition is identified from the plurality of query conditions in the database query. The database is queried based upon the identified query condition. At least one results characteristic is determined that is associated with the query of the database with the identified query condition. The results characteristic is used to analyze the identified query condition.

56 Claims, 11 Drawing Sheets

SYSTEM AND METHOD FOR DATA FLOW ANALYSIS OF COMPLEX DATA FILTERS

BACKGROUND OF THE INVENTION

1. Technical Field

The present invention is generally related to computer databases, and more particularly to computer database querying analysis.

2. Description of the Related Art

There are many known software systems and methods for querying a database. One of the most popular software query languages is known as SQL (or Structured Query Language.) SQL provides a framework for logically structuring complex conditional expressions that can be used to query a database. SQL includes many different types of logical constructs, including the WHERE clause, the HAVING clause and the ON clause. A WHERE clause is typically structured as follows: WHERE (variable 1 <operator> condition 1) link (variable 2 <operator> condition 2). The WHERE clause then returns data records from the database that meet the two conditional expressions (variable 1 <operator> condition 2) link (variable 2 <operator> condition 2), depending on the type of link. Two common forms of logical links for conditional expressions are the "AND" link and the "OR" link.

For example, consider a database containing personnel records for a company. Each employee's data record may include variable fields for storing salary and age. A user may then query the database to find those employees that are older than 35 and make less than $50,000 by forming the SQL query: WHERE (age >35) AND (salary <50,000). Here, age is variable 1, ">35" is condition 1, salary is variable 2, and "<50,000" is condition 2. The logical link operator is the AND link.

When an SQL SELECT statement contains many query conditions that are interconnected with each other through Boolean logic, the overall retrieval results might be unexpected. A user might be expecting to see many records retrieved when only a few or no records were actually retrieved. Current database querying approaches do not effectively analyze the data flow within a database query so as to detect such problematic situations.

In the above SQL query example, the query condition "(age >35)" may have such a restrictive effect upon the overall query that it acts to block all records. If it blocks all records, then the other query condition "(salary <50,000)" is rendered insignificant since the ANDing of the conditions will result in zero records due to the "age" condition blocking all the records. Current approaches do not detect where in the database query the problem is occurring. The present invention overcomes these disadvantages as well as other disadvantages.

SUMMARY OF THE INVENTION

In accordance with the teachings of the present invention, a computer-implemented method for analyzing a database query is provided. The database query contains a plurality of query conditions that are used to filter data records of a database. The query data flow analysis method identifies at least one query condition from the plurality of query conditions in the database query. The database is queried based upon the identified query condition. At least one results characteristic is determined that is associated with the query of the database with the identified query condition. The results characteristic is used to analyze the identified query condition.

According to another aspect of the invention, a computer-implemented system is provided for analyzing database queries. The database query contains a plurality of query conditions that are used to filter data records of a database. A query parser module identifies at least one query condition from the plurality of query conditions in the database query. A query condition executor module connected to the query parser module performs a query of the database based upon the identified query condition. A results analyzer module connected to the query condition executor module determines at least one results characteristic associated with the query of the database by the identified query condition. A results data structure connected to the results analyzer module stores an association between the identified query condition and the results characteristic. The results characteristic is used to analyze the identified query condition.

It should be noted that these are just some of the many aspects of the present invention. Other aspects not specified will become apparent upon reading the detailed description of the preferred embodiment set forth below.

DETAILED DESCRIPTION OF THE DRAWINGS

Figure 1:
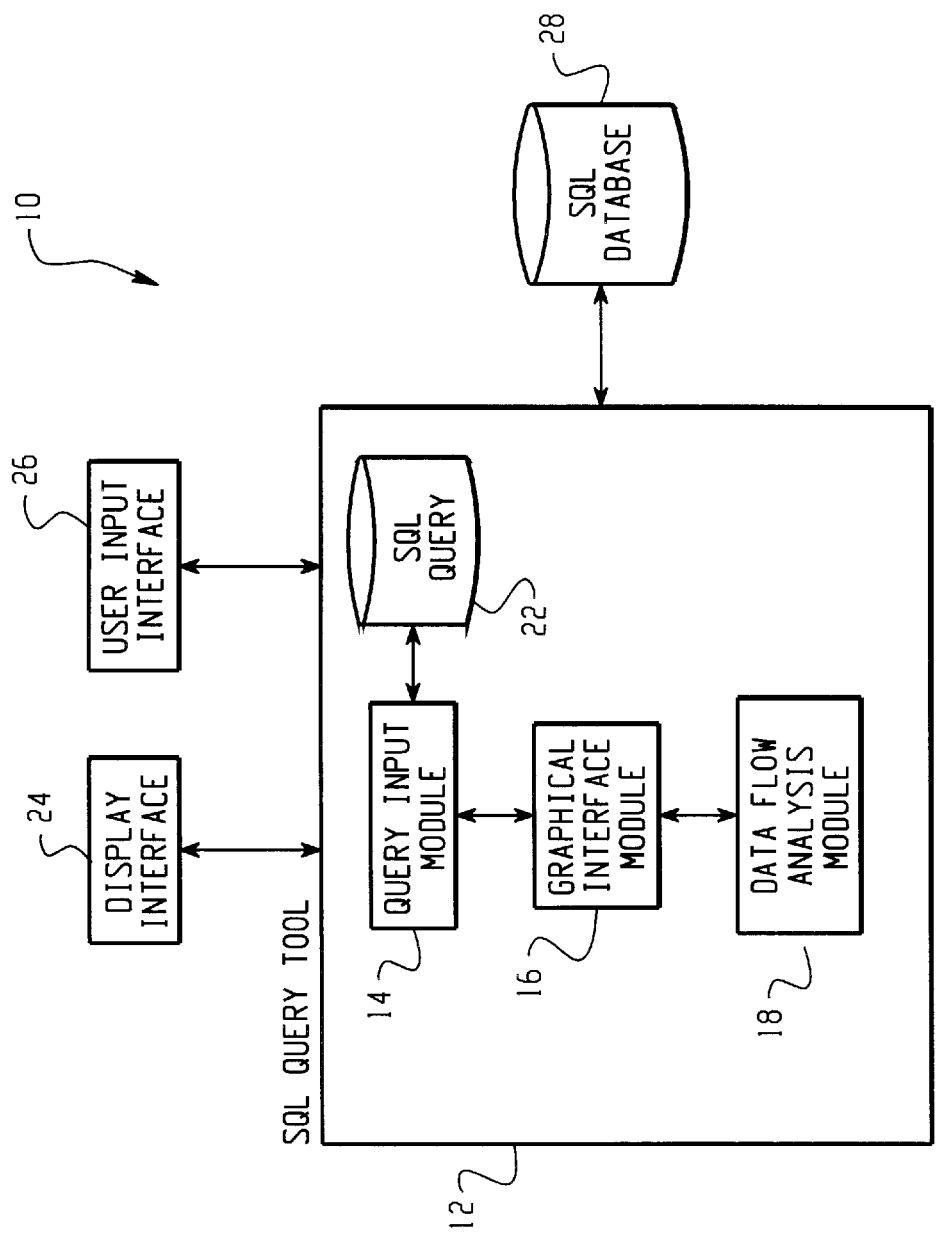
FIG. 1 is a block diagram of a preferred system according to the present invention.

FIG. 1 depicts a block diagram of a preferred system 10 according to the present invention. This system 10 preferably includes an SQL Query Tool 12 (or other form of query language tool), a display interface 24, a user input interface 26 and an SQL database 28 (or some other form of database that a user desires to query.) The SQL Query Tool 12 preferably includes a query input module 14, a graphical interface module 16, a data flow analysis module 18, and an SQL query data store 22. Although these modules are shown as being coupled in a particular manner, they could be coupled in some other manner.

The display interface 24 may be a display screen, such as is commonly associated with a desktop computer, laptop, PDA, etc. The display interface 24 receives video data signals from the SQL Query Tool 12 and displays these signals so as to depict a graphical representation of the query. The user input interface 26 may be any type of mechanism for inputting data and instructions into the SQL Query Tool 12, such as a keyboard, mouse, microphone, etc. The SQL database 28 may be any type of data storage structure, such as a data warehouse, data mart, or any other type of database where records are stored that may be searched and retrieved using a data analysis tool.

The SQL Query Tool 12 is preferably implemented as a software program that is part of a comprehensive data mining application for use in data analysis and search and retrieval operations on a database. An example of such a data mining application is Enterprise Miner™, which is available from SAS Institute Inc., of Cary, N.C. Alternatively, however, the SQL Query Tool 12 may be a stand-alone software application, a downloadable applet, or some other form of software-based application. This software may be embodied in a tangible medium, or product, such as a magnetic medium, or an optical medium such as a CD-ROM.

Several modules are preferably included in the SQL Query Tool 12, such as a query input module 14, a graphical interface module 16, and a data flow analysis module 18. Also included in (or associated with) the SQL Query Tool may be an SQL query data store 22.

The query input module 14 enables a user to input a data filter query into the system 10. This module 14 interacts with the graphical interface module 16 and the display and user input interfaces 24, 26 to enable the user to create, edit, and then save data filter queries to the SQL query data store 22. In one embodiment, this query input module 14 provides a window for inputting and manipulating data filter queries, as shown in more detail in FIGS. 2–7 and 9–10, set forth below. The query input module 14 may provide a menu bar for selecting certain query operations, such as "create a new query," "save a query," "store a query," etc. In one embodiment of the invention, a user inputs a complex data filter query by inputting the SQL query language directly into a text window or by retrieving the text of the SQL query from some storage location. In another embodiment of the invention, the user builds the query graphically using the elements of the graphical paradigm described in more detail below. In still another embodiment, the user builds the query using the query design grid environment provided by such relational database software applications as Microsoft® Access (which is available from Microsoft Corporation, Redmond, Washington). The system 10 generates a graphical filter network having a plurality of filter nodes that logically corresponds to the textual query language of the data filter.

The data filter queries that are input and manipulated by the system shown in FIG. 1 are preferably SQL-type queries. Alternatively, however, other types of data queries could be used with the system and software modules described herein.

Typically, when creating a database query, a user desires to limit or filter through query conditions the data records stored in the database 28 for subsequent analysis. This filtering is typically achieved by using the SQL WHERE clause, which is typified by the syntax "WHERE (variable 1 <operator> condition 1) link (variable 2 <operator> condition 2)" then return the data records whose variables meet the stated conditions. For example, the clause could be written "WHERE (haircolor='Red') or (salary <50,000)," in which case data records would be retrieved from the database in which the haircolor variable was 'Red' or the salary variable was a number less than 50,000.

The WHERE clause typically includes multiple conditional expressions, each of which is modeled in the present invention as a filter node. The filter nodes are logically linked together to form a filter network. For example, in the WHERE clause, a filter node may be linked to another filter node by the AND link operator. Alternatively, the nodes may be linked by the OR link operator. These link operators are logical constructs that couple the nodes together in order to form a more complex data filter. A non-limiting example of a complex data filter includes multiple filter nodes connected by multiple logical link operators as described below in connection with FIG. 2. Although the SQL WHERE clause is used as an example herein for filtering, it should be understood that this is just an example, and other types of query conditions, such as the HAVING clause or the ON clause, or any other form of filtering clauses, could be used with the teachings described herein, The graphical interface module 16 is connected to the query input module 14 and graphically maps the SQL statement (or clause) into a graphical representation of the data filter using a more readily-understandable graphical paradigm. Alternatively, the graphical interface module interacts with the query input module 14 in order to enable the user to build the query directly using the graphical representation. In either case, the graphical interface module 16 builds a model of the query using a plurality of filter nodes that are linked to form a filter network.

Data flow analysis module 18 analyzes the sections of a database query to determine what role each section has in the database query. For example, a database query may include an SQL Select statement that has several query conditions in its WHERE clause. Each query condition is intended to provide a filter in retrieving records from tables in a database. However, unintended query effects may result, such that one query condition might negate the effect of all other query conditions. One such exemplary situation is where two query conditions are ANDed together and the first query condition's effect is to not retrieve any data records from the database. The second query condition does not have any effect upon the query since its filter's effect will be negated by the first filter's blocking effect.

Data flow analysis module 18 detects this blocking condition as well as other query-related cases of interest to users and to computer programs that analyze database queries. In the preferred embodiment, module 18 uses a generate-and-execute approach. The SQL statement to be analyzed is parsed into clauses, and within each clause, there exist sections, which are modified in accordance with the teachings of the present invention. Once modified, an SQL statement is generated and executed to achieve results to be used for the analysis.

For example, in the FROM clause, the sections typically include the tables, joins, and join relationship information, and are identified as a join group. A join group includes a table, or a table joined to another table with regards to the join and the join condition, and so on successively. For the WHERE clause, the sections are the conditions set in the query, and are identified as a condition, or successive conditions, depending on how the SQL statement is structured. For the GROUP BY clause, the sections are the groups set in the query, and are identified as each single group. Lastly, for the HAVING clause, the sections are the conditions set on the groups. They are also identified as a condition or successive conditions, depending on how the SQL statement is structured. The results obtained from an analyzed condition constitute the incoming data for the subsequent condition. After each condition is so analyzed, the results of the data flow analysis exhibit the flow of data throughout the query. (FIG. 8 below provides exemplary steps in performing the data flow analysis of the present invention).

Because queries involved in the data flow analysis of the present invention tend to be complex due to the query's interconnected conditions, it becomes difficult, if not impossible, to understand the logic of the filter. For this reason, the present invention preferably includes a graphical interface module 16 that converts the complex logic of the SQL query textual command into a graphical paradigm, which is preferably based on the concept of water passing through a plumbing system.

Figure 2:
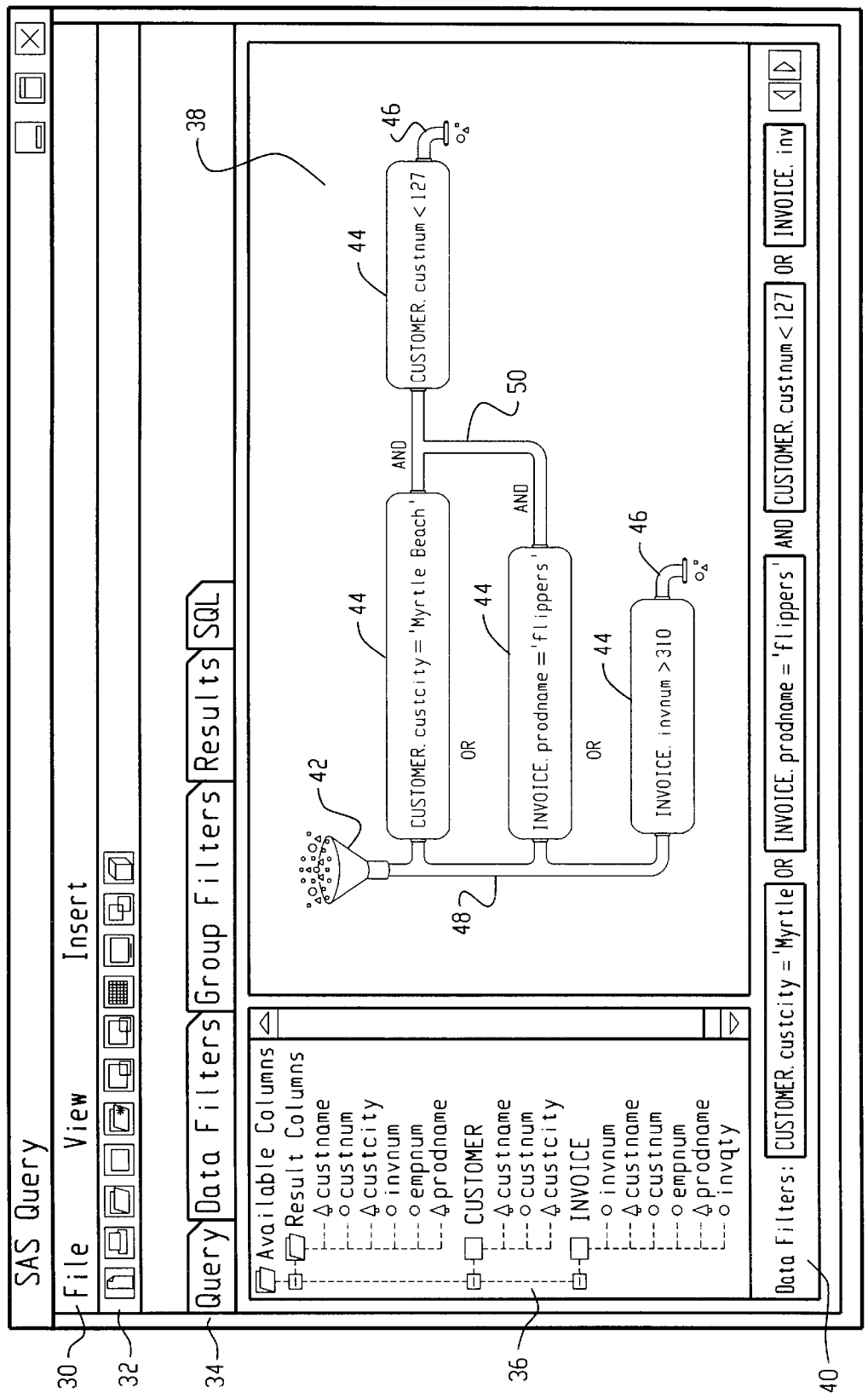
FIG. 2 is a graphical representation of a complex data filter with logical connections between filter nodes.

As shown and described in more detail below with reference to FIG. 2, this plumbing paradigm graphically depicts the complex data filter 38 as a network of filter nodes 44 that are linked by pipes 48 and 50, and which includes a single originating node 42 and one or more terminating nodes 46. Each filter node 44 represents a condition of expression of the SQL clause. These filter nodes are then linked by at least two types of pipes, a straight-line pipe 50 that represents the AND link operator, and a tee-line pipe 48 that represents the OR link operator. The originating node 42 of the filter is represented as a giant funnel, and the one or more terminating nodes 46 are represented by faucets. Any data records that successfully traverse the filter network 38 from the origin 42, through the filter nodes 44, and to one of the terminating nodes 46, have met the filter conditions for this clause, and are retrieved from the database. By depicting the complex SQL query using this graphical paradigm, a user of the SQL Query Tool 12 can more easily input, manipulate, and understand complex data filter queries.

To further assist the user in designing a filter, query input module 14 in the preferred embodiment provides a graphical user interface with a menu bar 30, tool bar 32 for performing certain query operations, such as "create a new query", "save a query", and "store a query". Tabs 34 allow a user to examine different views of the query filter. For example, selection of the "Data Filters" tab allows the user to view the graphical representation of the data filter, while selection of the "SQL" tab allows the user to view the SQL textual command string corresponding to the graphical representation.

Pane 36 depicts the columns available for use in the data filter. For example, column "invnum" from table invoice is available for use in the data filter. As another example, the user has selected column "invnum" to be part of the Result Columns as shown in pane 36. Pane 40 includes the text of the data filters that are graphically depicted as complex data filter 38.

Figure 3:
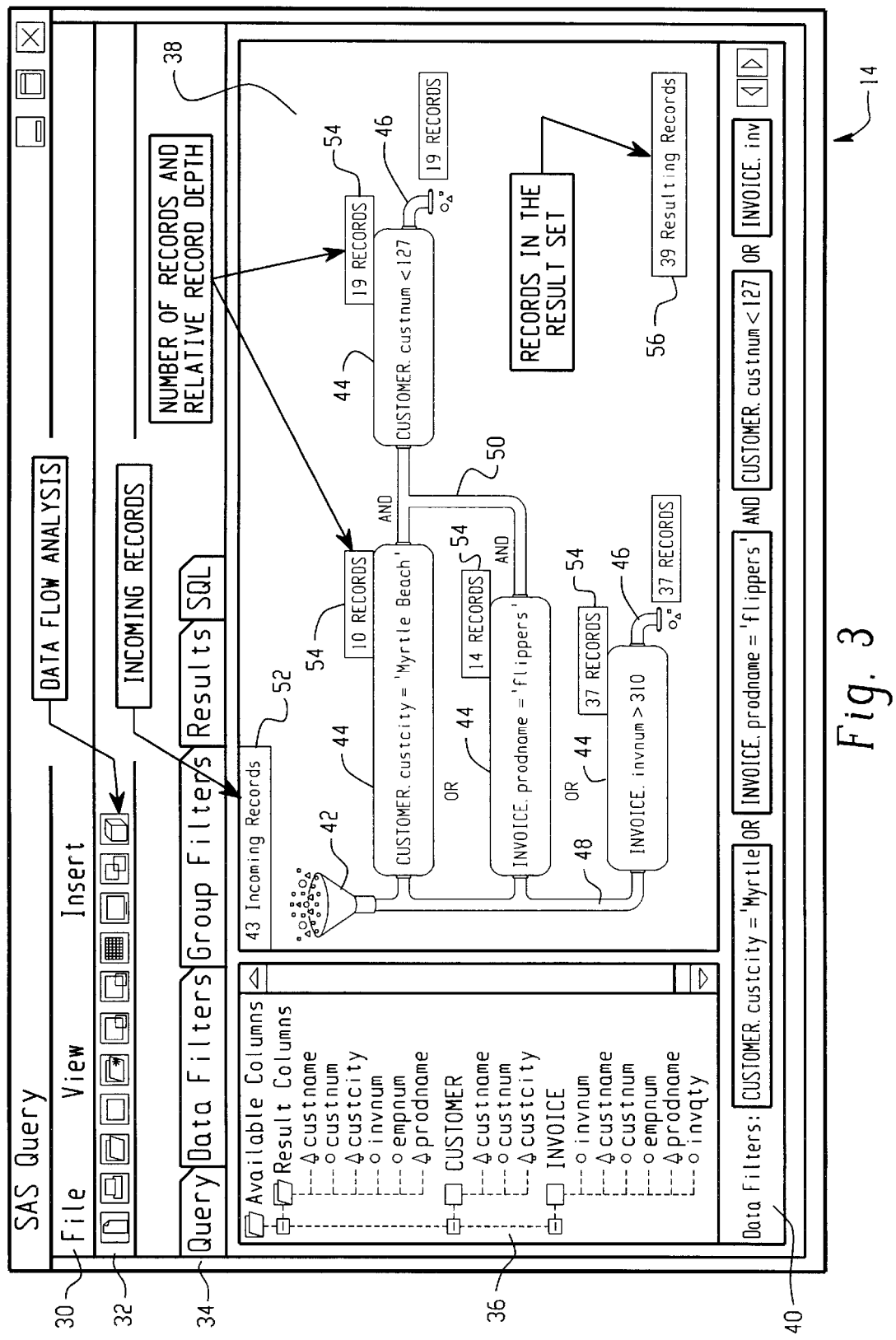
FIG. 3 is a graphical representation of a complex data filter with individual query condition data results.

FIG. 3 depicts data flow analysis associated with the query conditions or filters of complex data filter 38. The user can activate the data flow analysis of the present invention by selecting the data flow analysis icon located on toolbar 32. Once selected, the present invention determines for each stage of the complex data filter 38 the number of records processed. The number of records incoming to the complex data filter 38 is first determined. For this non-limiting example, forty-three records are incoming to the complex data filter 38 as shown by the result box being displayed proximate to originating node 42.

Result boxes 54 are displayed for filter nodes 44. For example, filter "CUSTOMER.custcity='Myrtle Beach'" reduces the number of records retrieved from the forty-three incoming records down to ten records. The filter "INVOICE.prodname='flippers'" reduces the incoming records from forty-three records to fourteen records. Result boxes 54 indicate the number of records at each stage of the complex data filter 38 and the relative record depth.

Due to the OR logical connection between the two filters, the unique combination of records from the two filters are passed onto filter "CUSTOMER.custnum<127". Preferably, the number of records passed onto this last filter is also displayed to indicate the effect the filter has on reducing the number of records retrieved. The results box 54 displayed proximate to this last filter shows the number of records that the three filters generates based upon their combined Boolean logic interconnection. In this way, the total number of records at each stage (thus far retrieved) is displayed. The combined three filters retrieve nineteen records.

In an alternate embodiment, the number of records each filter individually retrieves is displayed proximate to the filter as well as the number of records thus far retrieved. In yet another alternate embodiment, the present invention provides such other query results characteristics as the execution time required to process a filter. With these results characteristics, a user can better determine whether to eliminate a filter that is time consuming while having little or no effect in restricting the number of records retrieved.

The "INVOICE.invnum>310" filter retrieves thirty-seven records and when ORed with the nineteen records from the other terminating node, thirty-nine records are produced in the result set as shown by result box 56. Thus, the present invention provides the significant advantage of viewing the data results at each stage of a query. The present invention also detects and highlights whether certain potentially problematic query cases exist. FIGS. 4–7 exemplify such detection and highlighting by the present invention.

Figure 4:
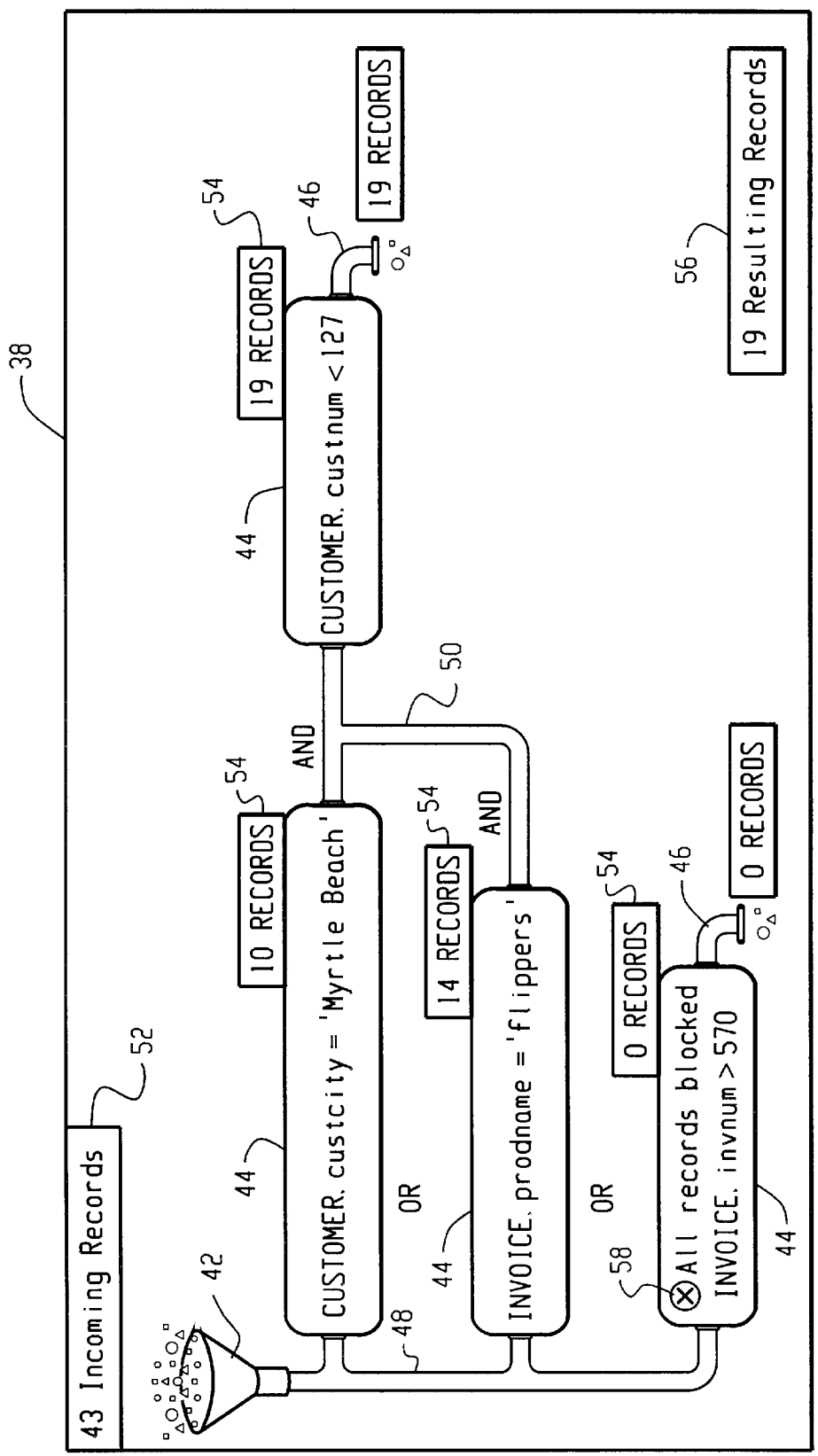
FIG. 4 is a graphical representation of a complex data filter wherein the present invention indicates that a filter node has blocked all records.

FIG. 4 depicts an example of the present invention detecting and highlighting a potentially problematic query case. Filter "INVOICE.invnum>570" is receiving forty-three records and is allowing none of the records to pass. Indicator 58 highlights that the filter is blocking all of the records and displays a message of "All records blocked". This condition disallows records to pass through the filter, and could therefore cause no records to reach the result set or block a significant path in the filter network. The user can use indicator 58 to analyze the impact of this blocking condition and to determine whether the condition should be used or modified in the complex data filter 38.

Figure 5:
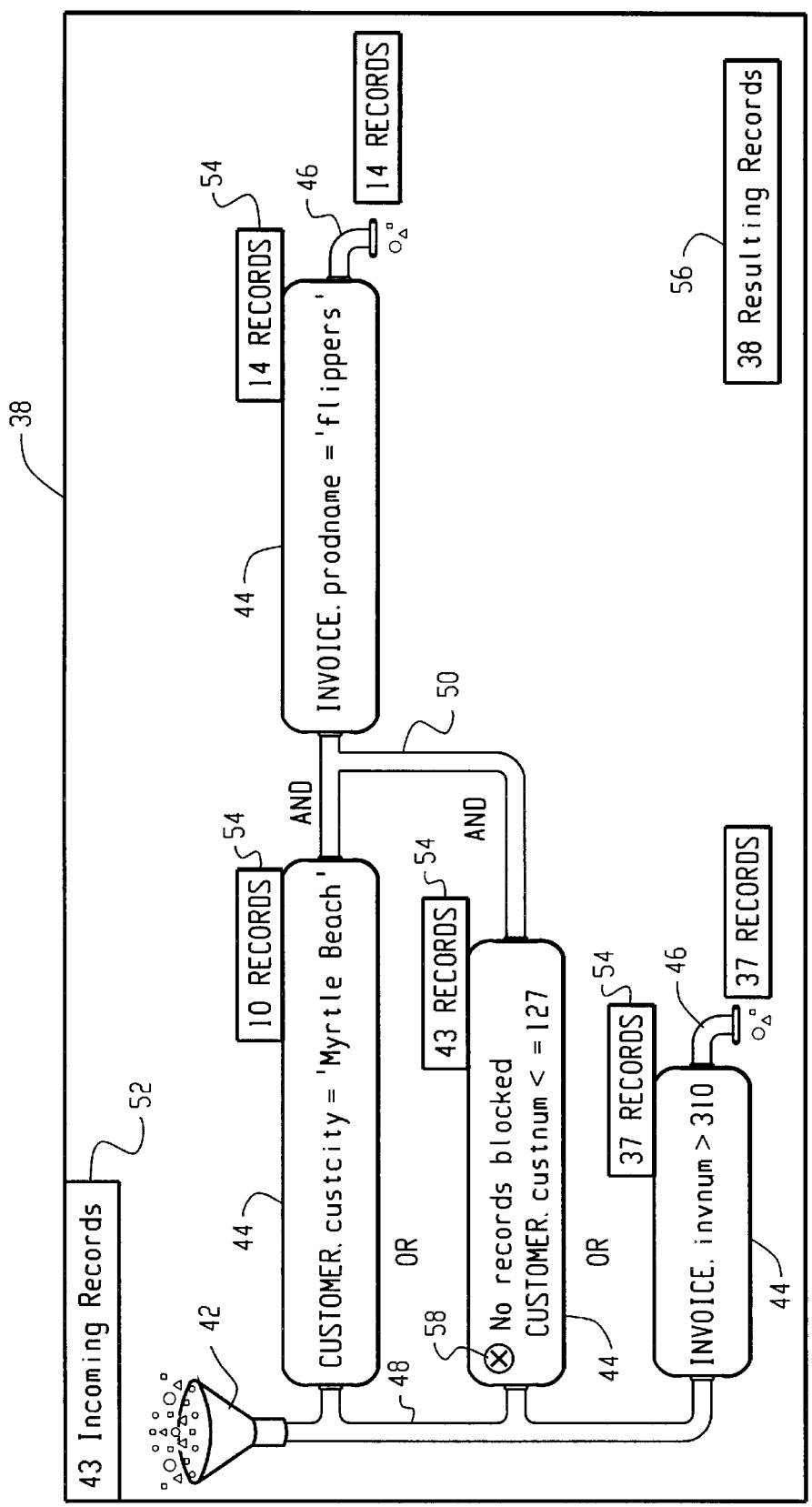
FIG. 5 is a graphical representation of a complex data filter wherein the present invention indicates that a filter node has not blocked any records.

FIG. 5 depicts an example of the present invention detecting and highlighting a query condition that does not block any records. Filter "CUSTOMER.custnum <=127" receives forty-three records and allows all of the records to pass. Indicator 58 highlights that the filter is not blocking any of the records and displays a message of "No records blocked". The user can use indicator 58 to analyze the impact of this non-blocking filter. In some situations, this type of filter could play an insignificant role to the overall query, or it could nullify the condition set by another node, and potentially changing the intention of the condition setup. Its significance depends on its position in the overall complex data filter 38.

Figure 6:
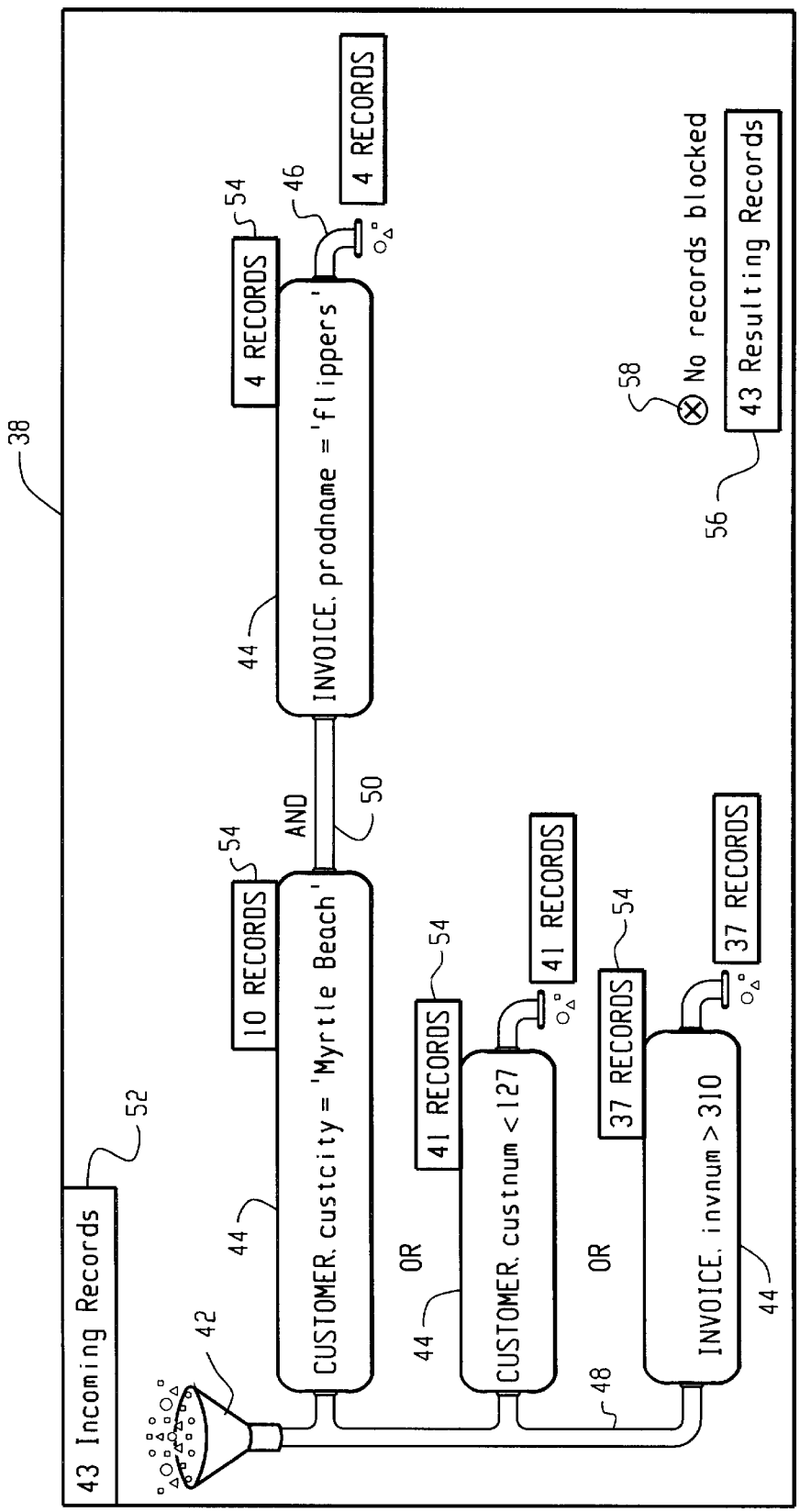
FIG. 6 is a graphical representation of a complex data filter wherein the present invention indicates that the incoming records for a filter node equals the resulting records.

FIG. 6 depicts an example of the present invention detecting and highlighting a complex data filter 38 that does not block any records. Forty-three records enter the complex data filter 38 and forty-three records exit the complex data filter 38. For this situation, the present invention displays a textual message 58 of "No records blocked" proximate to result box 56. The situation implies that all the records in the result set equal the total number of incoming records, thus the conditions have no effect. This would be the solution to a mutually exclusive case wherein records from terminating nodes 46 combine to form all of the incoming records. Because the present invention has detected and highlighted this situation, the user can more quickly determine how the complex data filter 38 needs to be reformulated in order to filter at least some of the incoming records.

Figure 7:
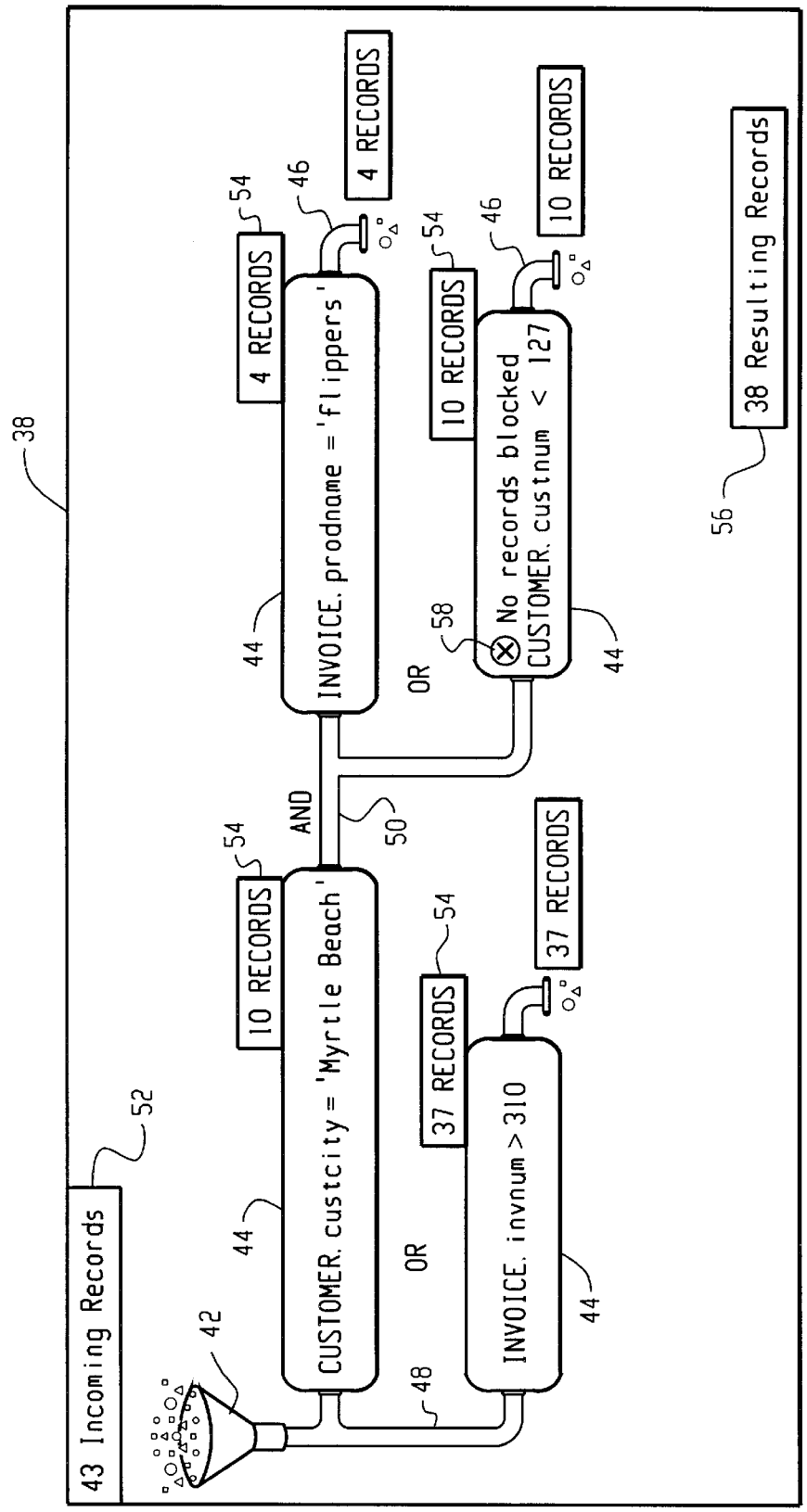
FIG. 7 is a graphical representation of a complex data filter wherein the present invention indicates that the same number of records are found within a non-interrupted path.

FIG. 7 depicts an example of the present invention detecting and highlighting a complex data filter 38 where two filter nodes within a non-interrupted path contain the same number of records. The present invention traverses each path and detects when the same number of records occur within two subsequent nodes. This indicates that the latter node is not blocking any of the records it receives. The present invention highlights the two nodes in question to indicate that the same records are passing through. The present invention alerts the user that this situation could cause the nullification of another condition in the complex data filter 38, or the insignificance of either of these nodes.

Figure 8:
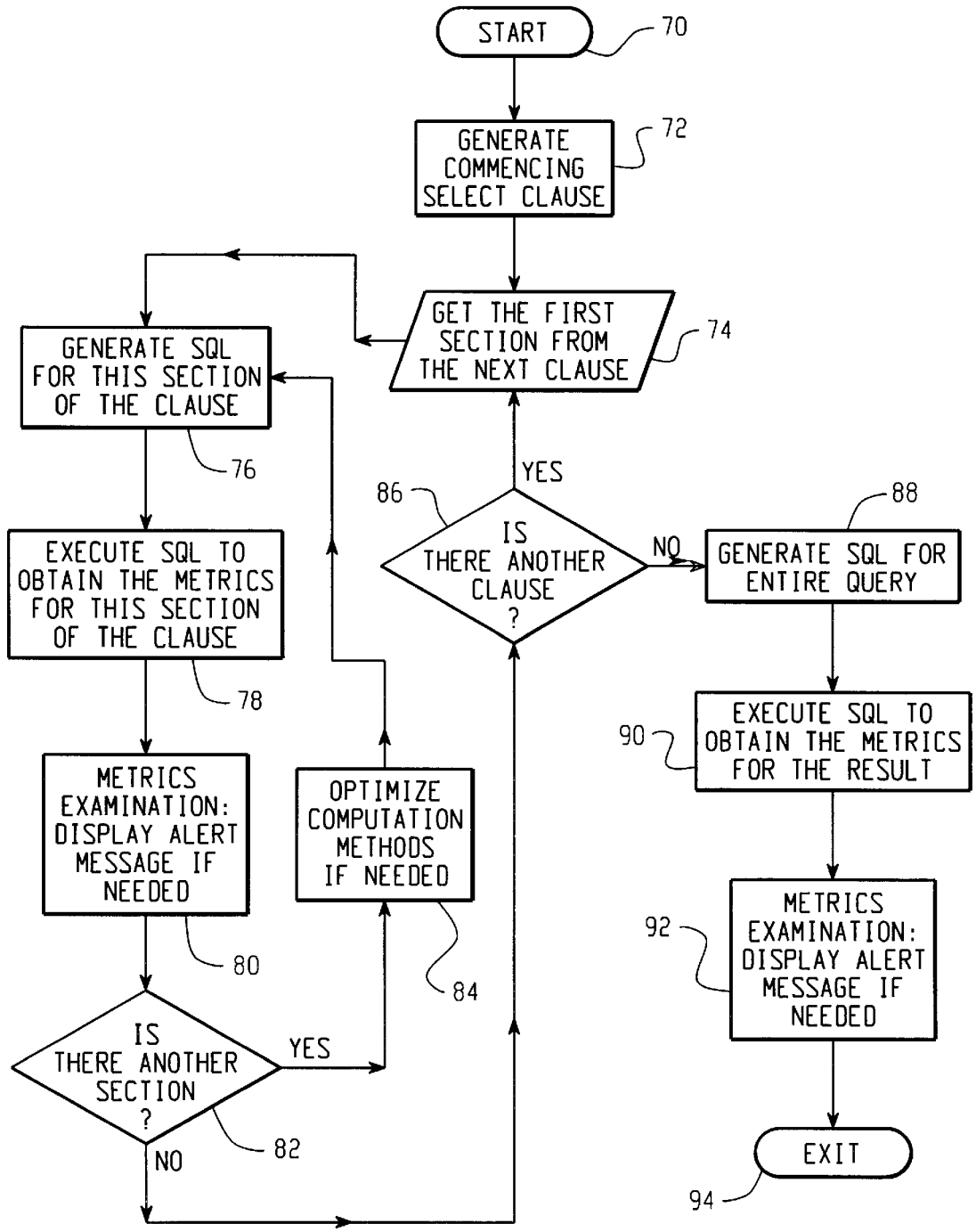
FIG. 8 is a flowchart depicting the steps for performing data flow analysis of a query statement.

FIG. 8 is a flow chart depicting the preferred steps to perform data flow analysis of a query statement. The present invention uses computer-implemented software to perform the steps. Processing starts at step 72 wherein a commencing SELECT statement is generated the commencing SELECT statement is used to retrieve the entire incoming record information from the data source, for example, the entire count of incoming records.

Step 74 obtains the first section of the subsequent clause in the SQL statement. An SQL statement is generated at step 76 that pertains to the obtained section. The SQL statement includes the commencing SELECT clause, any preceding clauses, and a generated clause regarding the obtained section. Step 78 executes the SQL statement to obtain the metrics to be used in the data flow analysis. These metrics include but are not limited to the count of records flowing through each clause or section of a clause, the actual time it takes for the individual computations, or the estimated time for the individual computations. Step 80 examines the metrics to determine whether any potential cases exist that may be of concern towards the analysis. Such cases include whether the metrics indicate that the current SQL section being examined is blocking all records. In such cases, an alert message is displayed. Control passes to step 82.

Step 82 examines whether another section exists in the current clause. If another section exists, then the computation and query execution methods for the next section are optimized at step 84 if needed. When needed, the following exemplary type of optimization is performed: if a node blocks all the records it receives, yet it feeds another node(s), and the former was the only parent node, then the latter child node(s) will be not be processed.

If at step 82 no other section is contained in the current clause, then control passes to step 86 which examines whether another clause exists in the original SQL statement to be analyzed. If there is another clause, then control passes to step 74. If there is no other clause, then control passes to step 88. Step 88 generates an SQL statement by appending the commencing SELECT clause to the rest of the other clauses as they appear in the original SQL query. Step 90 executes the SQL statement to obtain the metrics to be used in the analysis of the entire query. Step 92 examines the metrics to determine whether any potential cases exist that may be of concern towards the analysis. If any potential cases are detected, then alert messages are displayed. Processing stops at step 94 and commences again at step 70 when further data flow analysis is required.

Figure 9:
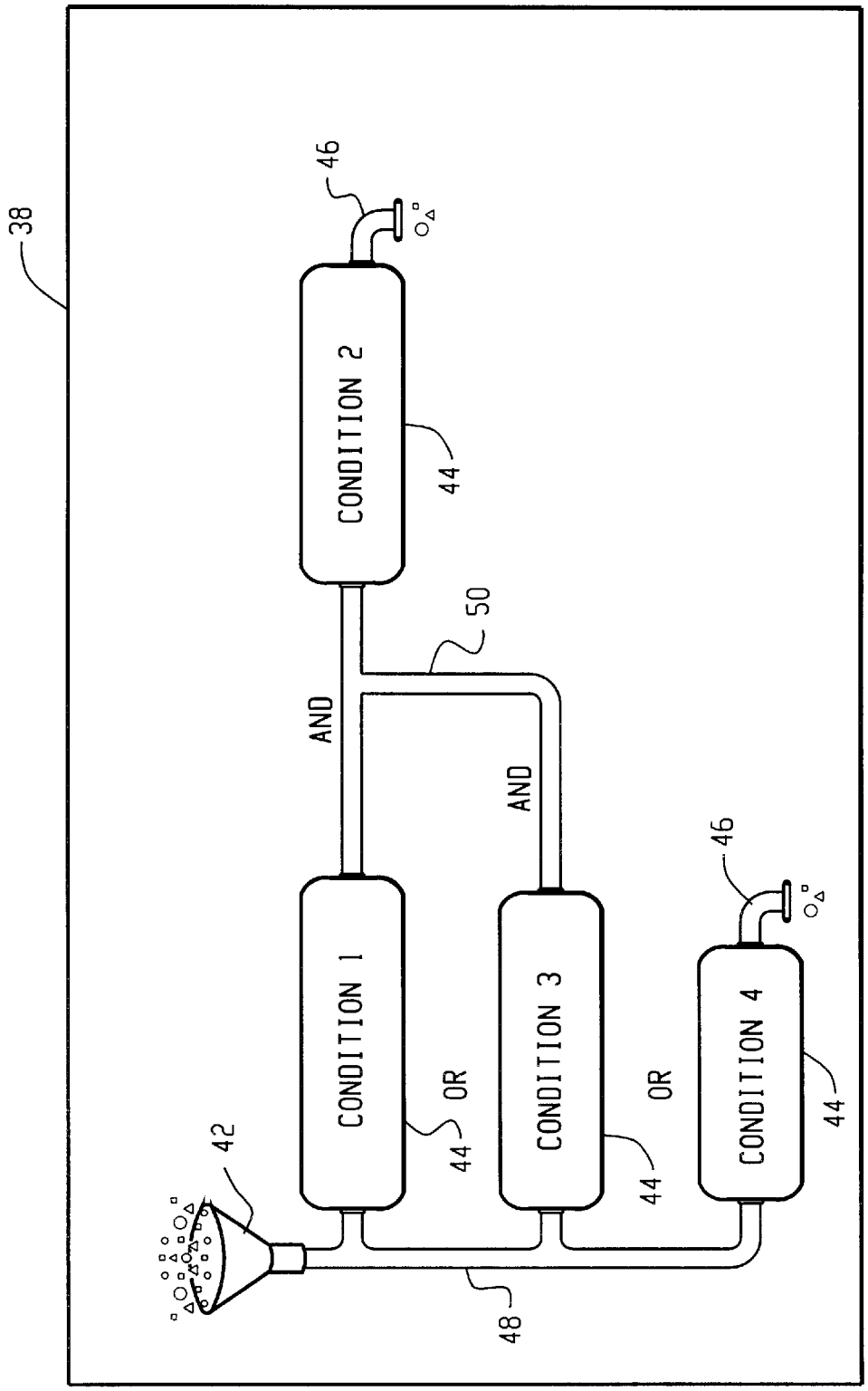
FIG. 9 is a graphical representation of a complex data filter to be analyzed in accordance with the teachings of the present invention.
Figure 10:
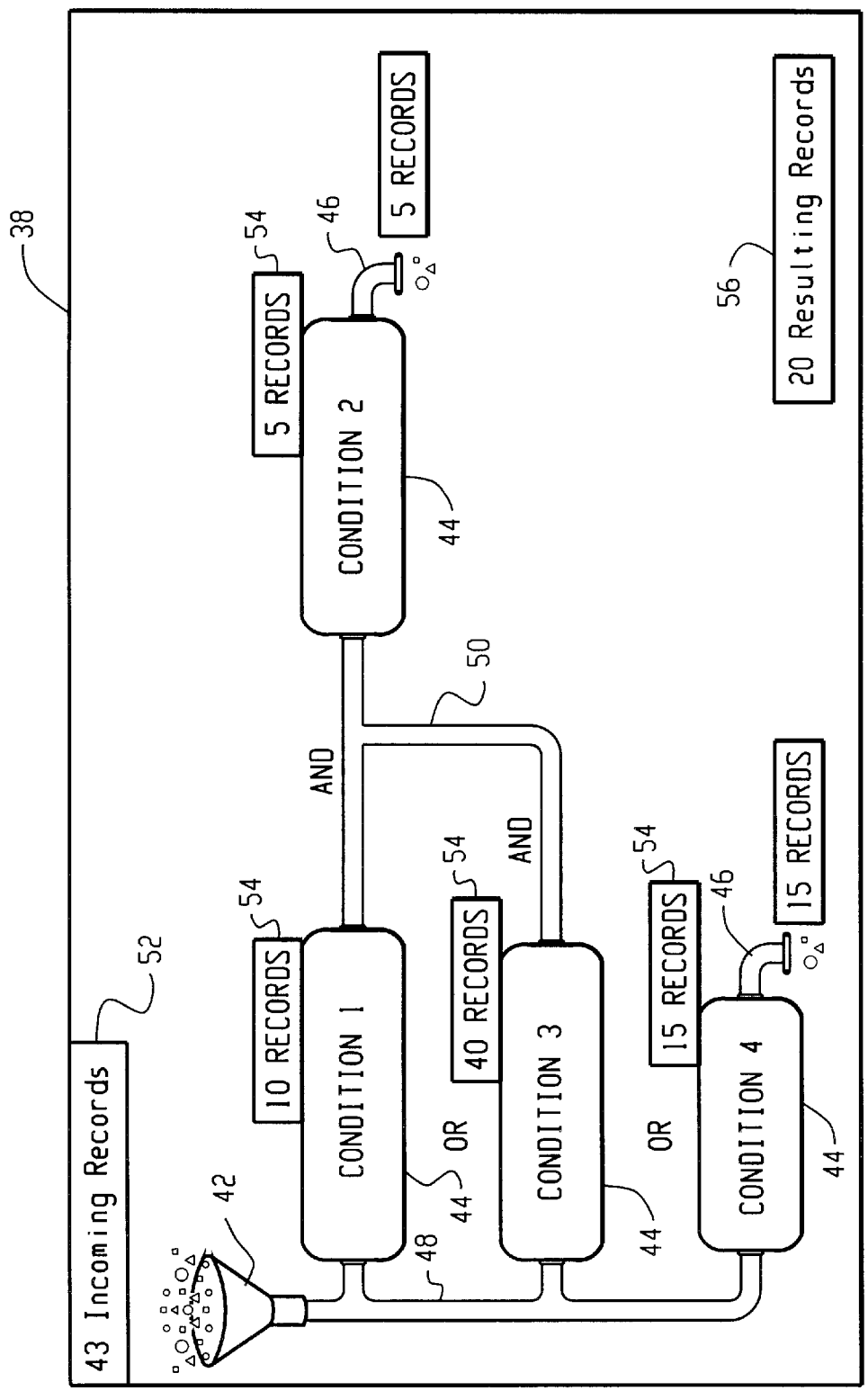
FIG. 10 is a graphical representation of a complex data filter analyzed in accordance with the teachings of the present invention.

FIGS. 9 and 10 illustrate the data flow analysis approach described in the flow chart of FIG. 8. FIG. 9 is a graphical representation of the following exemplary query:

SELECT column 1, column 2

FROM tables

WHERE ((Condition 1 OR Condition 3) AND Condition 2) OR Condition 4

ORDER BY column 1

Initially, the commencing SELECT statement is generated to obtain the count of records from the data sources. The FROM information is then obtained to form the following SQL statement:

SELECT count(*)

FROM tables

This SELECT statement obtains the metrics for the total number of incoming records. Subsequently, an SQL statement is generated for each of the sections in the WHERE clause. In this example, the following sections in the WHERE clause are obtained from the original SQL statement:

Section 1: Condition 1

Section 2: ((Condition 1 OR Condition 3) AND Condition 2)

Section 3: Condition 3

Section 4: Condition 4

In an alternate embodiment, the number of records each filter individually retrieves is displayed proximate to the filter as well as the number of records thus far retrieved. Thus, the present invention includes in this alternate embodiment another section to be analyzed that examines the effect of Condition 2 alone as well as the effect of Condition 2 in combination with Condition 1 and Condition 3. Since this alternate embodiment includes additional computation overhead, the user is preferably presented with an option as to whether all conditions are to be examined individually.

With the four sections obtained, the commencing SELECT statement and the FROM clause of the query are combined individually with each of the four sections. As shown in FIG. 9, the query conditions are graphically shown as filter nodes. The graphically generated WHERE clause may not necessarily conform to the textual SQL WHERE clause due to structural and visual optimization of the filter network (see FIG. 11).

All of the nodes (if any) along the same path leading to the condition in question are specified in the generated WHERE clause since they affect the number of records that the latter receives. Thus, the parent-child relationship established throughout the network is exploited to generate the WHERE clause, which is then executed to achieve the number of records complying with that condition. Accordingly, the SQL for the condition 1 node in FIG. 9 is:

SELECT count(*)

FROM tables

WHERE Condition 1

The SQL for the condition 2 node is:

SELECT count(*)

FROM tables

WHERE ((Condition 1 OR Condition 3) AND Condition 2)

The SQL for the condition 3 node is:
   SELECT count(*)
   FROM tables
   WHERE Condition 3
The SQL for the condition 4 node is:
   SELECT count(*)
   FROM tables
   WHERE Condition 4

In this example, the data flow analysis metric is the number of records. A filter node depth is also determined by examining the ratio of the record count on each node to the total number of records coming into the filter network. The result is displayed as the filter node's depth. For each of the condition node SQL statements, the present invention determines the number of resulting records and how many nodes are remaining. This information is used in part to determine whether optimizations can be applied to any remaining condition node SQL statements.

To obtain the total number of resulting records, the SELECT statement used in the previous steps is obtained and appended to the rest of the SQL statement for the entire query. In this example, the following SQL statement is generated:
   SELECT count(*)
   FROM tables
   WHERE ((Condition 1 OR Condition 3) AND Condition 2) OR Condition 4
   ORDER BY column I In an alternate embodiment, the present invention does not include the ORDER BY clause if it does not have an effect upon the metrics of the data flow analysis, such as upon the records count.

FIG. 10 depicts the results of the SQL executions involved in this example's data flow analysis. Metrics examination is performed at each SQL execution to determine whether any cases of interest arise, such as a blocking node case. If any of the cases were detected, then FIG. 10 would contain a display message indicating for which filter node such a case was detected.

Figure 11:
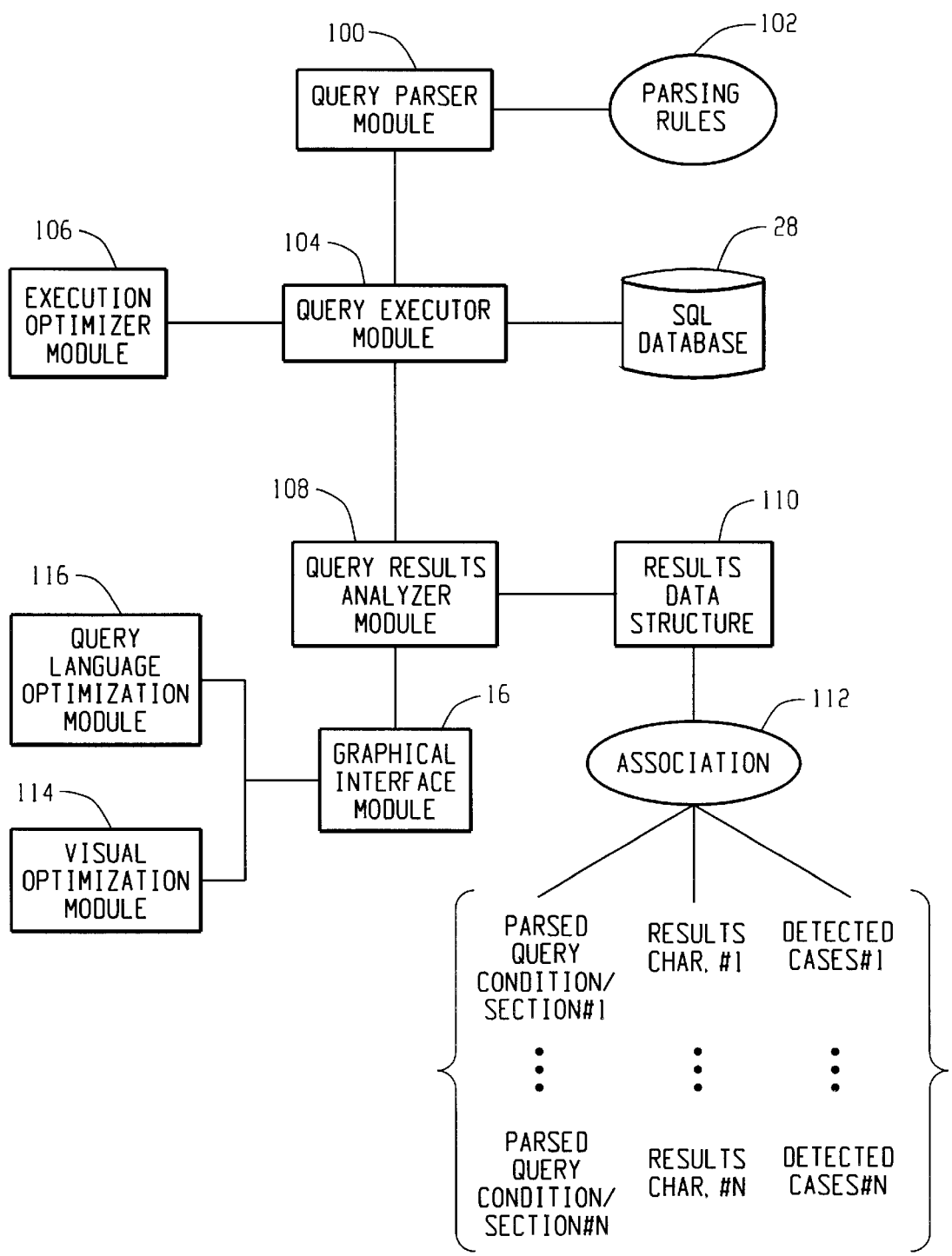
FIG. 11 is a software module structure block diagram depicting the software module structure for analyzing the data flow of individual query conditions.

FIG. 11 is a software module structure block diagram that depicts the software module structure for analyzing the data flow of sections of a SQL SELECT statement. A query parser module 100 parses a SQL SELECT statement uses parsing rules 102 that identify sections of the SQL statement. Parsing rules 102 include identification rules to determine what types of clauses are in the SQL statement, such as WHERE, FROM, and HAVING clauses. Parsing rules 102 may include how sections are to be determined based upon the logical arrangement of the query conditions within the SQL statement.

The query parser module 100 generates SQL statements in order to produce metrics associated with each identified section. SQL statements are also generated to determine metrics associated with incoming records and records resulting from the original SQL statement. A query executor module 104 queries SQL database 28 using each of the generated SQL statements. If needed, an execution optimizer module 106 optimizes the computation and query execution methods for the next section based upon previously executed SQL statements.

One or more metrics resulting from execution of the generated SQL statements are stored in a results data structure 110 by the query results analyzer module 108. The results data structure 110 contains storage locations for forming an association between parsed query conditions and such results characteristics as a record count metric.

The query results analyzer module 108 also examines the results to determine whether one or more cases of interest (such as a blocking node case) arises. If a case is detected, then the results data structure 110 is populated to indicate that a case has been detected for a particular parsed query condition.

Graphical interface module 16 displays the results proximate to their respective filter node query condition. Before the graphical filter network is displayed, further optimization may be performed, such as optimization by the visual optimization module 114 and query language optimization module 116.

The visual optimization module 114 optimizes the graphical display of the data filter query by merging sub-networks of the filter network that generate the same query language, and the query language (or SQL) optimization module 116 optimizes the structure of the data filter query by eliminating redundant filter nodes from the filter network.

The visual optimization module 114 analyzes the filter network to determine whether there are sub-networks that can be merged in order to simplify the display of the filter network through the graphical interface module 16. The visual optimization module 114 does not change the logic of the SQL clause in any manner, but rather it identifies parts of the filter network that include similar query language and, where possible, merges the relevant filter nodes in order to simplify the displayed filter network. The query language optimization module 116, by distinction, identifies redundant filter nodes in the network and removes or deletes the redundant nodes in order to minimize the logical structure of the SQL query.

FIG. 11 depicts an example of the connection among the software modules to analyze the data flow for a database query. This is but one example to connect the software modules. For example, the query executor module 104 can be directly connected to the graphical interface module 16 for the graphical interface module 16 to display the executed query. Accordingly, the term "connected" signifies but is not limited to a data access pipeline between modules so as to allow data and other needed computer information to be exchanged directly or indirectly between the two modules. Other modules or networks may occur between the two modules. Therefore, connection does not mean solely that a first module is directly connected to another module, but also includes a module sending and/or receiving information indirectly from another module, such as through one or more different modules and/or through a network. A network includes but is not limited to local area networks, wide area networks, global networks (such as the Internet) and other types. For example, SQL database 28 can be located locally on the same computer performing the data flow analysis or can be located remotely over a network, such as over the Internet. The term "module" includes but is not limited to a unit or units of code that performs a software operation, and can be implemented for example as a subroutine unit of code, or as a software function unit of code, or as an object (as in an object-oriented paradigm), or as an applet, or in a computer script language, or as other type of computer code.

The preferred embodiment described with reference to the drawing figures is presented only to demonstrate an example of the invention. Additional, and/or alternative, embodiments of the invention would be apparent to one of ordinary skill in the art upon reading this disclosure.

For example, to reduce the computations for performing data flow analysis according to the teachings of the present invention, a subset database may be queried instead of the database that contains all of the data records. The subset database contains a subset of the data contained in the master database. The subset database can be generated using many techniques, such as by statistical sampling or limitation of observations. Statistical sampling can be used to generate a subset database by applying statistical designs to select a sample to be used for the data flow analysis. This reduces a distorted view of the observations and allows statistically valid inferences to be made. The subset database may also be generated using a limitation of observations. This approach uses a subset of the observations to perform the data flow analysis since a user may be interested in analyzing a certain portion of the data. Thus, it is obvious that the present invention may be varied in many ways. Such variations are not to be regarded as a departure from the spirit and scope of the invention, and all such modifications as would be obvious to one skilled in the art are intended to be included within the scope of the following claims.

What is claimed is:

1. A computer-implemented method for analyzing a structured query language (SQL) type database query, said SQL type database query containing a plurality of query conditions that are used to filter data records of a database, comprising the steps of:

identifying at least one SQL type query condition from the plurality of query conditions in the SQL type database query;

querying the database based upon the identified query condition;

determining at least one results characteristic associated with the query of the database with the identified query condition, wherein the results characteristic is used to analyze the identified query condition.

2. The method of claim 1 wherein the results characteristic includes number of records generated by querying the database based upon the identified query condition.

3. The method of claim 1 wherein the results characteristic includes computer execution time used to query the database based upon the identified query condition.

4. The method of claim 1 wherein the results characteristic is displayed with a visual graphical depiction of the database query.

5. The method of claim 4 wherein the visual graphical depiction of the query displays the Boolean logic of the database query.

6. The method of claim 4 wherein the visual graphical depiction includes nodes being associated with the query conditions.

7. The method of claim 6 further comprising the step of:
visually depicting the result characteristic proximate to the node associated with the identified query condition.

8. The method of claim 6 further comprising the steps of:
determining results characteristics for each of the query conditions in the database query; and
visually depicting the result characteristic proximate to the node associated with the identified query condition.

9. The method of claim 6 further comprising the steps of:
determining first results characteristics for the database query without the query conditions and visually depicting the first result characteristic proximate to a query originating input node on the graphical query depiction; and
determining second results characteristics for the database query with all of the query conditions and visually depicting the second results characteristic.

10. The method of claim 6 further comprising the step of:
using the results characteristic to determine whether a node blocks substantially all the records the node receives.

11. The method of claim 6 further comprising the step of:
using the results characteristic to determine whether a node blocks all the records the node receives.

12. The method of claim 6 further comprising the step of:
using the results characteristic to determine whether a node blocks substantially none of the records the node receives.

13. The method of claim 6 further comprising the step of:
using the results characteristic to determine whether a node blocks none of the records the node receives.

14. The method of claim 6 further comprising the step of:
using the results characteristic to determine whether the query conditions do not block any record.

15. The method of claim 6 further comprising the step of:
determining results characteristics for two subsequent query condition nodes;
using the determined results characteristics to determine whether the same number of records are retrieved by the two subsequent query condition nodes.

16. The method of claim 6 further comprising the steps of:
using the results characteristic to determine whether a node blocks all the records the node receives;
using the results characteristic to determine whether a node blocks none of the records the node receives;
using the results characteristic to determine whether the database query does not block any record;
determining results characteristics for two query condition nodes connected in series; and
using the determined results characteristics to determine that the same number of records are retrieved by the two query condition nodes.

17. The method of claim 1 further comprising the steps of:
generating a subset database from the database;
querying the subset database based upon the identified query condition; and
determining at least one results characteristic associated with the query of the subset database with the identified query condition,
wherein the results characteristic is used to analyze the identified query condition.

18. The method of claim 17 further comprising the step of:
generating the subset database by applying statistical designs to select a subset of the data from the database.

19. The method of claim 17 further comprising the step of:
generating the subset database by using a subset of observations from the database.

20. The method of claim 1 wherein the database query includes structured query language (SQL) query clauses having sections for filtering records from the database, said sections being selected from the group consisting of Where sections, From sections, Having sections and combinations thereof.

21. The method of claim 20 further comprising the steps of:
identifying whether Where sections are contained within the database query;
separately querying the database based upon each of the identified Where sections;
determining individual results characteristics for each of the identified Where sections resulting from the individual querying of the database, wherein the results characteristics are used to analyze the identified Where sections of the database query.

22. The method of claim 20 further comprising the steps of:
identifying whether From sections are contained within the database query;
separately querying the database based upon each of the identified From sections;
determining individual results characteristics for each of the identified From sections resulting from the individual querying of the database, wherein the results characteristics are used to analyze the identified From sections of the database query.

23. The method of claim 22 further comprising the steps of:
identifying whether Having sections are contained within the database query;
separately querying the database based upon each of the identified Having sections;
determining individual results characteristics for each of the identified Having sections resulting from the individual querying of the database, wherein the results characteristics are used to analyze the identified Having sections of the database query.

24. The method of claim 20 further comprising the steps of:
optimizing a query of a section based upon the results of a query from a preceding section.

25. The method of claim 1 wherein the database is used within a data mining application.

26. A computer-implemented system for analyzing a structured query language (SQL) type database query, said SQL type database query containing a plurality of query conditions that are used to filter data records of a database, comprising:
a query parser module that identifies at least one SQL type query condition from the plurality of query conditions in the SQL type database query;
a query condition executor module connected to the query parser module that performs a query of the database based upon the identified query condition;
a results analyzer module connected to the query condition executor module that determines at least one results characteristic associated with the query of the database by the identified query condition; and
a results data structure connected to the results analyzer module that stores an association between the identified query condition and the results characteristic,
wherein the results characteristic is used to analyze the identified query condition.

27. The system of claim 26 wherein the results characteristic includes number of records generated by querying the database based upon the identified query condition.

28. The system of claim 26 wherein the results characteristic includes computer execution time used to query the database based upon the identified query condition.

29. The system of claim 26 further comprising:
a graphical interface module connected to the query results analyzer module that displays the results characteristic with a visual graphical depiction of the query.

30. The system of claim 29 wherein the visual graphical depiction of the query includes the Boolean logic of the database query.

31. The system of claim 29 wherein the visual graphical depiction includes nodes associated with query conditions.

32. The system of claim 31 wherein the result characteristic is visually depicted proximate to the node associated with the identified query condition.

33. The system of claim 31 wherein the results analyzer module determines results characteristics for each of the query conditions in the database query, wherein the results data structure includes storage for associations between the determined results characteristics and their respective query conditions.

34. The system of claim 31 wherein the results analyzer module determines first results characteristics for the database query without the query conditions,
wherein the results data structure includes storage for an association between the determined first results characteristics and the database query without the query conditions,
wherein the results analyzer module determines second results characteristics for the database query with all of the query conditions,
wherein the results data structure includes storage for an association between the determined second results characteristics and the database query with all of the query conditions.

35. The system of claim 31 wherein the query results analyzer module uses the results characteristic to determine whether a node blocks substantially all the records the node receives.

36. The system of claim 31 wherein the query results analyzer module uses the results characteristic to determine whether a node blocks all the records the node receives.

37. The system of claim 31 wherein the query results analyzer module uses the results characteristic to determine whether a node blocks substantially none of the records the node receives.

38. The system of claim 31 wherein the query results analyzer module uses the results characteristic to determine whether a node blocks none of the records the node receives.

39. The system of claim 31 wherein the query results analyzer module uses the results characteristic to determine whether the database query does not block any record.

40. The system of claim 31 wherein the query results analyzer module determines results characteristics for two subsequent query condition nodes, wherein the results data structure includes storage for both the two subsequent query condition nodes and their respective determined results characteristics, wherein the query results analyzer module uses the determined results characteristics to determine whether the same number of records are retrieved by the two subsequent query condition nodes.

41. The system of claim 31 wherein the query results analyzer module comprises:
means for using the results characteristic to determine whether a node blocks all the records the node receives;
means for using the results characteristic to determine whether a node blocks none of the records the node receives;
means for using the results characteristic to determine whether the database query does not block any record;
means for determining results characteristics for two query condition nodes connected in series; and
means for using the determined results characteristics to determine that the same number of records are retrieved by the two query condition nodes.

42. The system of claim 26 further comprising:
a subset database having a subset of records in the database;

wherein the query executor module includes a connection to the subset database in order to query the subset database based upon the identified query condition; and wherein the query results analyzer module determines at least one results characteristic associated with the query of the subset database with the identified query condition, wherein the results characteristic is used to analyze the identified query condition.

43. The system of claim 26 wherein the database query includes structured query language (SQL) query clauses having sections for filtering records from the database, said sections being selected from the group consisting of Where sections, From sections, Having sections and combinations thereof.

44. The system of claim 26 further comprising:

parsing rules that the query parser module uses to identify query conditions and query sections, wherein the rules include identification rules that identify whether Where sections are contained within the database query, wherein the query executor module separately queries the database based upon each of the identified Where sections, wherein individual results characteristics for each of the identified Where sections are generated from the individual querying of the database, wherein the results characteristics are used to analyze the identified Where sections of the database query.

45. The system of claim 26 further comprising:

parsing rules that the query parser module uses to identify query conditions and query sections, wherein the rules include identification rules that identify whether From sections are contained within the database query;

wherein the query executor module separately queries the database based upon each of the identified From sections, wherein individual results characteristics for each of the identified From sections are generated from the individual querying of the database, wherein the results characteristics are used to analyze the identified From sections of the database query.

46. The system of claim 45 further comprising:

parsing rules that the query parser module uses to identify query conditions and query sections, wherein the rules include identification rules that identify whether Having sections are contained within the database query;

wherein the query executor module separately queries the database based upon each of the identified Having sections, wherein individual results characteristics for each of the identified Having sections are generated from the individual querying of the database, wherein the results characteristics are used to analyze the identified Having sections of the database query.

47. The system of claim 45 further comprising:

an execution optimizer module connected to the query executor module, wherein the execution optimizer module optimizes a query of a section based upon the results of a query from a preceding section.

48. The system of claim 26 wherein the database is used within a data mining application.

49. The system of claim 26 further comprising:

a graphical interface module connected to the query results analyzer module that displays the results characteristic with a visual graphical depiction of the query, wherein the visual graphical depiction includes nodes associated with the query conditions; and a query language optimization module connected to the graphical interface module, wherein the query language optimization module identifies redundant filter nodes in the network and removes the redundant nodes.

50. The system of claim 49 further comprising:

a visual optimization module connected to the graphical interface module, wherein the visual optimization module merges nodes that contain similar query conditions.

51. The system of claim 26 further comprising:

a graphical interface module connected to the query results analyzer module that displays the results characteristic with a visual graphical depiction of the query, wherein the visual graphical depiction includes nodes associated with the query conditions; and a visual optimization module connected to the graphical interface module, wherein the visual optimization module merges nodes that contain similar query conditions.

52. The system of claim 26 wherein the database query includes structured query language (SQL) query clauses having sections for filtering records from the database, wherein a section includes a join condition;

wherein the join condition is used in filtering records from the database;

wherein the results characteristic is determined based upon the filtering associated with the join condition.

53. A computer-implemented method for analyzing an SQL database query statement, said SQL database query statement containing a plurality of query conditions that are used to filter data records of a database, comprising the steps of:

identifying whether Where sections are contained within the SQL database query statement;

separately querying the database based upon each of the identified Where sections;

determining individual results characteristics for each of the identified Where sections resulting from the individual querying of the database, wherein the results characteristics are used to analyze the identified Where sections of the database query.

54. The method of claim 53 further comprising the steps of:

identifying whether From sections are contained within the SQL database query statement;

separately querying the database based upon each of the identified From sections;

determining individual results characteristics for each of the identified From sections resulting from the individual querying of the database, wherein the results characteristics are used to analyze the identified From sections of the SQL database query statement.

55. The method of claim 53 further comprising the steps of:

identifying whether Having sections are contained within the SQL database query statement;

separately querying the database based upon each of the identified Having sections;

determining individual results characteristics for each of the identified Having sections resulting from the individual querying of the database, wherein the results characteristics are used to analyze the identified Having sections of the SQL database query statement.

56. The method of claim 53, wherein the SQL database query statement includes structured query language (SQL) query clauses having sections for filtering records from the database, said sections being selected from the group consisting of Where sections, From sections, Having sections and combinations thereof, said method further comprising the step of:

optimizing a query of a section based upon the results of a query from a preceding section.

* * * * *